United States Patent
Ouyang et al.

(10) Patent No.: US 10,498,279 B2
(45) Date of Patent: Dec. 3, 2019

(54) ELECTROMAGNETIC MACHINE SYSTEM HAVING CURRENT INJECTION FOR INDUCTIVE EXCITATION OF WINDINGS

(71) Applicant: ABB Technology Ltd., Zurich (CH)

(72) Inventors: Wen Ouyang, Apex, NC (US); Jun Li, Cary, NC (US); Hongrae Kim, Cary, NC (US)

(73) Assignee: ABB Schweiz AG, Baden (CH)

( * ) Notice: Subject to any disclaimer, the term of this patent is extended or adjusted under 35 U.S.C. 154(b) by 881 days.

(21) Appl. No.: 14/949,203

(22) Filed: Nov. 23, 2015

(65) Prior Publication Data

US 2017/0149367 A1 May 25, 2017

(51) Int. Cl.
| | |
|---|---|
| *H02P 25/03* | (2016.01) |
| *H02K 19/12* | (2006.01) |
| *H02K 19/28* | (2006.01) |
| *H02K 19/26* | (2006.01) |

(52) U.S. Cl.
CPC ............. *H02P 25/03* (2016.02); *H02K 19/12* (2013.01); *H02K 19/26* (2013.01); *H02K 19/28* (2013.01)

(58) Field of Classification Search
CPC ...... H02P 5/74; H02P 9/00; H02P 9/08; H02P 9/20; H02P 9/14
See application file for complete search history.

(56) References Cited

U.S. PATENT DOCUMENTS

| | | | |
|---|---|---|---|
| 2,377,930 A | 8/1942 | Fuller | |
| 2,414,287 A | 1/1947 | Crever | |
| 3,768,002 A | 10/1973 | Drexler et al. | |
| 4,000,464 A * | 12/1976 | Nussel | G01R 31/34 324/765.01 |
| 4,939,441 A | 7/1990 | Dhyanchand | |
| 5,023,540 A * | 6/1991 | Walton | H02K 19/26 322/58 |
| 5,038,095 A | 8/1991 | Kirchberg et al. | |
| 5,039,933 A | 8/1991 | Dong | |
| 5,714,821 A | 2/1998 | Dittman | |

(Continued)

OTHER PUBLICATIONS

Holtz, J., Lotzkat, W., and Stadtfeld, S., "Controlled AC Drives with Ride-Through Capability at Power Interruption", IEE Transactions on Industry Applications, Sep./Oct. 1994, pp. 1275-1283, vol. 20, Issue 5.

(Continued)

*Primary Examiner* — Kawing Chan
*Assistant Examiner* — Zoheb S Imtiaz
(74) *Attorney, Agent, or Firm* — Taft Stettinius & Hollister LLP; J. Bruce Schelkopf

(57) ABSTRACT

A electromagnetic machine system includes a rotor and a stator positioned about the rotor. A current injection mechanism is coupled with windings of the stator and structured to inject electrical currents therein so as to change a flux distribution of a magnetic field produced by the stator. The injected currents may be harmonic currents. The rotor further includes an inductor positioned to interact with the magnetic field when the flux distribution is changed, to produce an electrical excitation current for exciting windings in the rotor. The machine system may be a synchronous motor or generator, and may be brushless. Applications of the current injection strategy to direct torque control and vector control are also disclosed.

16 Claims, 4 Drawing Sheets

(56) References Cited

U.S. PATENT DOCUMENTS

| | | | |
|---|---|---|---|
| 5,734,249 A | 3/1998 | Pohjalainen et al. | |
| 6,909,262 B2 | 6/2005 | Yao et al. | |
| 7,057,908 B2 | 6/2006 | Tarkiainen et al. | |
| 7,569,942 B2 | 8/2009 | Kamimura | |
| 2004/0021437 A1* | 2/2004 | Maslov | B60L 8/00 318/400.01 |
| 2007/0108854 A1* | 5/2007 | Osborn | H02K 11/042 310/68 D |
| 2011/0176229 A1* | 7/2011 | Saito | G02B 7/102 359/824 |
| 2012/0074879 A1* | 3/2012 | Fahimi | H02P 23/14 318/400.04 |
| 2012/0104756 A1* | 5/2012 | Beekmann | F03D 7/0224 290/44 |
| 2014/0252912 A1* | 9/2014 | Vohlgemuth | H02K 1/30 310/216.008 |
| 2015/0077067 A1* | 3/2015 | Kanjiya | H02P 9/10 322/21 |
| 2015/0228405 A1* | 8/2015 | Wang | H01F 38/18 310/126 |
| 2015/0263658 A1* | 9/2015 | Benya, Jr. | H02P 9/302 322/46 |
| 2017/0085161 A1* | 3/2017 | Gieras | H02K 17/30 |

OTHER PUBLICATIONS

Newman et al., Voltage Sag Ride Through Improvement of Modem AC Drives: Review of Methods and a Case Study, Integral Energy power Quality Centre, School of Electrical, Computer and Telecommunication Engineering, University of Wollongong, NSW 2522, Australia.

Pyrhönen, Analysis and COntrol of Excitation, Field Weakening and Stability in Direct Torque Controlled Electrically Excited Synchronous Motor Drives, Lappeenranta University of Technology, Research papers 74, 1998.

Kaukonen, Salient Pole Synchronous Machine Modelling in an Industrial Direct Torque Controlled Drive Application, Lappeenranta University of Technology, 1999.

* cited by examiner

ELECTROMAGNETIC MACHINE SYSTEM HAVING CURRENT INJECTION FOR INDUCTIVE EXCITATION OF WINDINGS

BACKGROUND

The present disclosure relates generally to excitation of windings in an electromagnetic machine system, and relates more particularly to injecting electrical current into a stator such that a flux distribution of a stator magnetic field is changed in response to the injected electrical current to induce electrical excitation currents in exciter circuitry of a rotor.

A vast array of electromagnetic machine systems such as electric motors and electric generators are well-known and widely used. Most such systems include a stationary component referred to as a stator and a movable component referred to as a rotor. One or both of the stator and the rotor will typically include permanent magnets or electro-magnets.

Electromagnetic interaction between the stator and rotor induces relative motion between the two or generates electrical current, all in a well-known manner. For so-called synchronous machines it is generally necessary to electrically excite windings in the rotor so as to produce a rotor magnetic field that is either induced to rotate by a rotating magnetic field in the stator, in the case of a synchronous motor, or induces a magnetic field in the stator in the case of a generator. In either instance, a dedicated electrical exciter separate from the rotor itself is typically used to produce electrical current that excites the rotor windings. Existing systems have a number of shortcomings at least in certain applications.

Disclosure

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment is a unique electromagnetic machine system that includes a rotor and a stator positioned about the rotor. A current injection mechanism is coupled with windings of the stator and injects electrical currents into the stator so as to change a flux distribution of a magnetic field produced by the stator. The rotor includes an inductor positioned to interact with the magnetic field when the flux distribution is changed, thereby producing an electrical excitation current for exciting the rotor windings. Further embodiments, forms, objects, features, advantages, aspects, and benefits shall become apparent from the following description and drawings.

DETAILED DESCRIPTION OF ILLUSTRATIVE EMBODIMENTS

Figure 1:
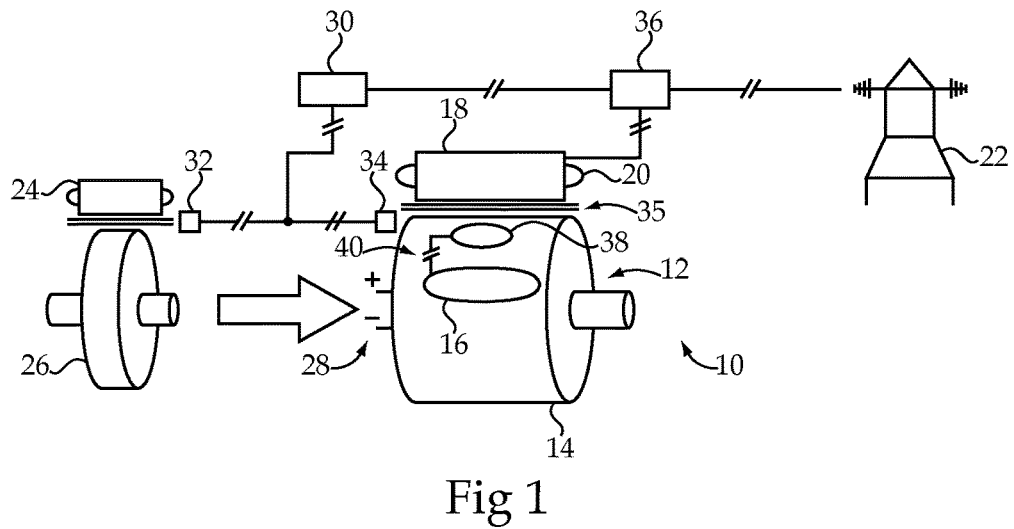
FIG. 1 is a diagrammatic view of a machine system, according to one embodiment.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Referring to FIG. 1, there is shown an electromagnetic machine system 10 including an electromagnetic machine 12 according to one embodiment. Machine 12 includes a synchronous rotational machine in the nature of an electric motor or electric generator. Machine 12 is shown coupled with an electrical power grid or the like 22 for purposes of feeding electrical power from grid 22 to machine 12, feeding electrical power from machine 12 to grid 22, or both. Machine 12 includes a rotor 14 having rotor windings 16, and a stator 18 positioned about rotor 14 and including stator windings 20 structured to conduct primary electrical currents. The primary electrical currents may include polyphase alternating current (AC) that is supplied to machine 12 from grid 22 for inducing rotation of rotor 14. Additionally or alternatively, the primary electrical currents could be produced in stator 18 in response to rotation of rotor 14. System 10 may also include an exciter 22 that includes an exciter stator 24 and an exciter rotor 26. Electrical leads 28 are provided upon rotor 14 and structured to receive electrical power, AC electrical power or rectified DC electrical power, produced by exciter 22 for the purpose of exciting windings 16. Exciter 22 might be operated via motive power produced via a mechanical linkage to a water or wind powered turbine, an electrical generator, or any other suitable mechanism. Those skilled in the art will be familiar with systems where a relatively small service generator or the like is provided for producing electrical power that excites windings in a larger generator or electric motor. In at least some embodiment, stator 18 may be understood as or as including an armature, and rotor 14 may be understood as including a field winding or field coil. It is contemplated the present disclosure will find applications across a broad range of industries. For instance, in the case of motors relatively heavy duty hoists and the like of the type used in mining, construction, or industrial applications are contemplated. It is contemplated the teachings of the present disclosure can be scaled up or scaled down for both motor and generator applications, as the case may be. As will be apparent from the following description, the present disclosure is uniquely configured for resiliency and reliability, as well as efficiency.

System 10 may further include a current injection mechanism 36 coupled with stator windings 20 and structured to inject secondary electrical currents into stator windings 20 such that a flux distribution of a magnetic field produced by stator 18 is changed. It can be seen that an air gap 35 extends between rotor 14 and stator 18. It is believed that injection of secondary currents as further discussed herein results in a change in the distribution of magnetic flux within or adjacent to air gap 35, thus potentially affecting flux linkage between rotor 14 and stator 18. Rotor 14 further includes an inductor 38 coupled with rotor windings 16 and positioned to interact with the magnetic field when the flux distribution is changed, so as to produce an electrical excitation current for exciting rotor windings 16. In a practical implementation strategy, current injection mechanism 36 might be or be part of the electric drive that conveys electrical power between grid 22 and machine 12. Accordingly, current injection mechanism 36 may be an actively controlled AC to AC converter having a plurality of transistor switches of generally known configuration. An electronic control unit 30 can be provided to control current injection mechanism 36 according to present requirements. The manner of operating system 10, and in particular the manner in which electronic control unit 30 manipulates AC to AC converter/mechanism 36, is further described below.

It will be recalled that exciter 22 provides an electrical excitation current to rotor 14, and in particular an electrical excitation current to rotor windings 16. In one embodiment, the electrical output of exciter 22 might be DC, but in most instances will be AC. Accordingly, a rectifier may be provided between exciter 22 and machine 12 such that electrical leads 28 are fed with DC. In certain instances exciter 22, or whatever external and dedicated separate exciter is used, may fail or suffer from performance degradation. In such instances, the excitation current and thus magnetic field produced by rotor windings 16 will begin to decay or otherwise be disrupted. As a result, the synchronous coupling between rotor 14 and stator 18 can be compromised unless some mechanism for so called ride-through is provided. Inductor 38 can provide the electrical excitation current for exciting rotor windings 16 as further described herein. For purposes of detecting a fault, system 10 may be equipped with one or more sensors 32 and 34 that monitor the states of exciter 22 and machine 12. In one embodiment, sensor 32 may be operably coupled with exciter 22 and structure to detect a failure or interruption or other change in electrical state of exciter stator 24. In such an instance, electronic control unit 30 can interpret the changed electrical or magnetic state of or between stator 24 and rotor 26 and commence controllably injecting secondary electrical currents by way of mechanism 36. System 10 may also be equipped with a second sensor 34 to monitor the state of machine 12, such as sensing an interruption or change in electrical current conveyed to rotor 14 from exciter 22, and analogously adjust or commence injecting electrical current via mechanism 36.

Those skilled in the art will further be familiar with brushes and commutators employed to maintain electrical connections between a rotating piece of machinery such as rotor 14 and a stationary electrical supply such as parts of exciter 22 or another source of electrical excitation current. To this end, electrical leads 28 might be brushes or potentially commutators. The foregoing description emphasizes application of system 10 in the context of an electromagnetic machine system with a separate and dedicated exciter. It is also contemplated that embodiments can be constructed according to the present disclosure which lacks a separate exciter altogether, at least apart from components and circuitry resident upon rotor 14. Accordingly, machine 12 might be brushless, which should be taken to mean that no separate electrical connections are used for the purposes of electrically coupling rotor 14 with separate and dedicated exciter circuitry. Another way to understand this principle is that inductor 38, or such other inductors as might be used, provide all of the electrical excitation current that is needed to maintain rotor 14 synchronous with stator 18.

Figure 2:
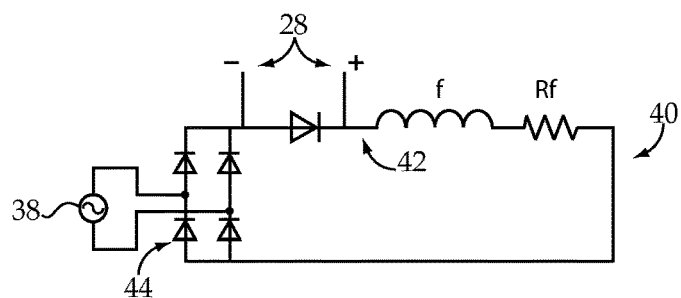
FIG. 2 is a circuit diagram of electrical excitation circuitry, according to one embodiment.

Referring also now to FIG. 2, there is shown exciter circuitry 40 such as might be resident upon rotor 14 for the purposes of exciting rotor windings 16, represented by the inductor Lf in FIG. 2. Circuitry 40 may be resident on rotor 14, and includes a DC bus 42 coupled with electrical leads 28 and with inductor 38. A rectifier 44 may be coupled between inductor 38 and DC bus 42 such that alternating current produced by inductor 38 is converted to DC and conveyed to rotor windings 16. Another rectifier or diode (not numbered) may also be provided in circuitry 40 for rectifying currents supplied to electrical leads 28. It should be appreciated that embodiments with only a single diode, or some other diode array might be used instead of the example circuitry set forth in FIG. 2.

From the foregoing description it will be apparent that the present disclosure provides a unique induction methodology and machine design so as to transfer power from the stator side to the rotor field winding via injection of secondary electrical currents, which may have the form of non-synchronous harmonics. In some instances, the impact of the stator side current harmonic on inductor 38 may be asymmetric due to saturation. In other words, a stator side harmonic current to intensify the main field flux may contribute less flux change than the harmonic current with flux weakening effects. This can ultimately result in asymmetric induction in the field winding as well. Embodiments are contemplated where a filter is included in circuitry 40 so as to reduce such asymmetry and current ripple and achieve better control performance.

Figure 3:
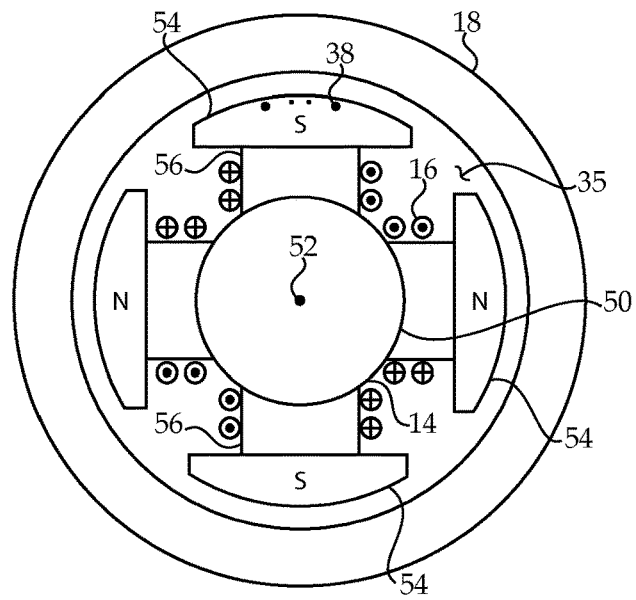
FIG. 3 is a diagrammatic view of a portion of the machine system of FIG. 1.
Figure 4:
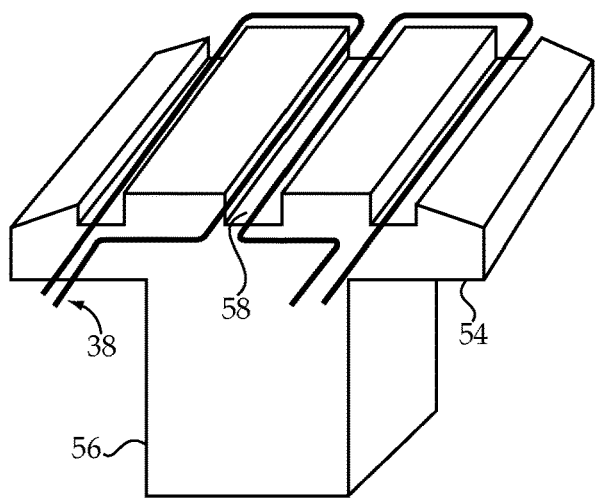
FIG. 4 is a diagrammatic view of a rotor pole shoe and inductor assembly according to one embodiment.

Turning now to FIGS. 3 and 4, there are shown certain components of rotor 14 in greater detail. Rotor 14 includes a rotor body 50 defining a rotor axis of rotation 52. A plurality of pole shoes 54 are part of rotor body 14 and project in radially outward directions. Rotor windings 16 are positioned about pole supports 56, radially between a center part of rotor body 50 and pole shoes 54. It can be seen from FIG. 3 that each of the plurality of sets of rotor windings is spaced circumferentially about rotor axis 52, and oriented relative to axis 50 so as to produce a rotor magnetic field when electrically excited, that interacts with the stator magnetic field produced by stator 18. Exciter circuitry, including inductor 38, is resident upon rotor body 14 and has at least one of a position and an orientation about rotor axis 52 that is different from any one of rotor windings 16. Inductor 38 is structured according to the at least one of a position and an orientation to interact with the stator magnetic field to produce an excitation current for exciting rotor windings 16, when a flux distribution of the stator magnetic field is changed in response to an injection of secondary electrical currents into stator 18 as discussed herein. For purposes of the present description, each of the center part of rotor body 50, pole supports 56 and pole shoes 54 can all be considered part of rotor body 50. In FIG. 4 it can be seen that inductor 38 includes multiple coils that are positioned within grooves 58 in pole shoe 54. Although only two loops of conductive wire are shown in FIG. 4, it should be appreciated that a plurality of coils could be used. The dedicated harmonic winding configuration on or just adjacent to the radially outer rotor body surface captures the air gap flux harmonics for exciting the rotor windings 20 as discussed herein. In a practical implementation strategy, the pole winding or dedicated harmonic winding design should be matched with the harmonic components introduced from the stator side phase winding currents. In other words, for effective and certainly optimally efficient power transfer from stator to rotor, the construction of inductor 38 is linked to harmonic components to be introduced, as further discussed herein.

Figure 5:
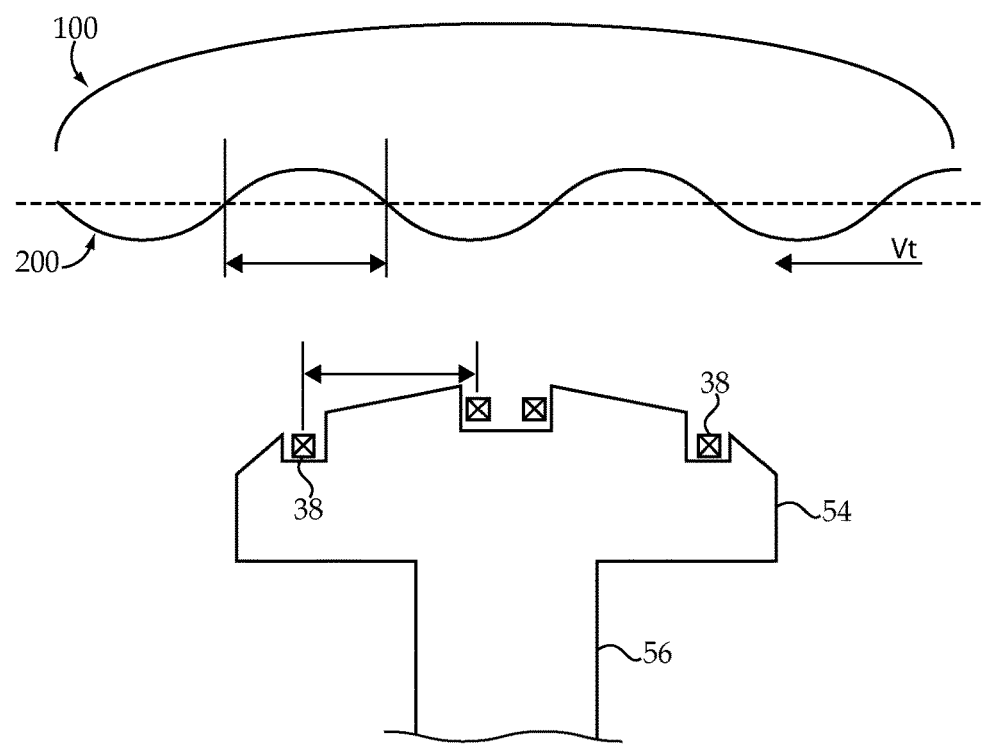
FIG. 5 a concept diagram illustrating example flux distribution of a magnetic field according to a primary electrical current carried by stator windings and also according to a secondary, injected current.
Figure 6:
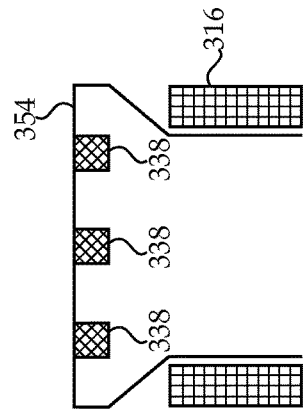
FIG. 6 is a diagrammatic view of an inductor winding and rotor configuration, according to one embodiment.
Figure 7:
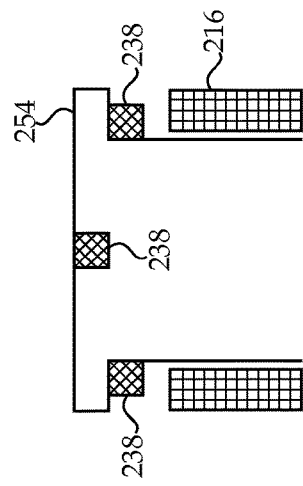
FIG. 7 is a diagrammatic view of an inductor winding and rotor configuration according to another embodiment.
Figure 8:
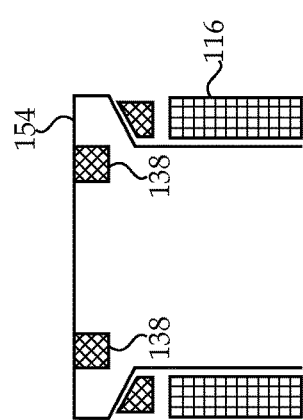
FIG. 8 is a diagrammatic view of an inductor winding and rotor configuration according to yet another embodiment.

Referring now to FIG. 5, there is shown a concept diagram illustrating theoretical flux distribution differences about air gap 35 in relation to a primary phase current 100 and an injected secondary current 200. In the illustrated instance, the injected secondary current is the fifth harmonic current of phase current 100. It can be seen that a dimension lambda/2 defined as one-half wavelength of the injected secondary current is a distance between the runs of coil/conductive wire in inductor 38. In this example embodiment, the dedicated harmonic coil or inductor 38 is designed specifically to pick up a changed flux distribution in air gap 35 that results from injection of the fifth harmonic current. In other instances, with injection of other harmonic currents, a different coil design could be used. Referring to FIG. 6, there is shown a pole shoe 154 having a different inductor 138 and field coil 116 structured to respond to different harmonic currents. In FIG. 7, yet another design of an inductor 238 mounted upon a pole shoe 254 in proximity to a field winding 216 is shown. In FIG. 8, yet another design of an inductor 338 mounted on a pole shoe 354 in proximity to a field winding 316 is shown.

Figure 9:
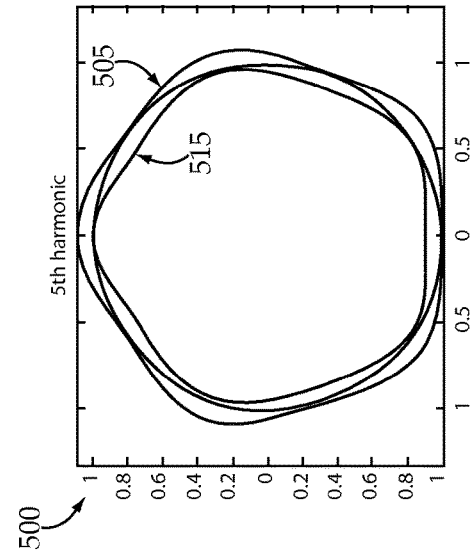
FIG. 9 is an illustration of a flux linkage hysteresis control reference band according to one embodiment.
Figure 10:
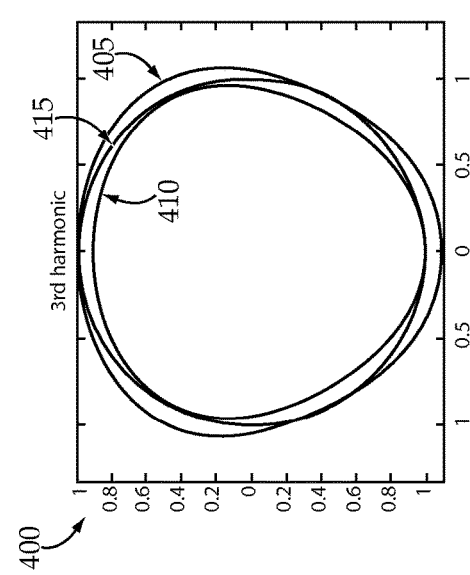
FIG. 10 is an illustration of a flux linkage hysteresis control reference band according to another embodiment.

Those skilled in the art will be familiar with the variety of control strategies used in synchronous motors and generators. Varying the flux distribution by way of injecting secondary currents as discussed herein can affect the considerations taken into account for machine control. In one example, system 10, and in particular machine 12, can be operated via so called directed torque control (DTC). DTC is generally based on machine flux trajectory estimation. For a harmonic current injection, in a DTC strategy according to the present disclosure a modulated reference stator flux trajectory method can be used. In general terms a torque/flux linkage error determines a next switching vector to achieve desired torque response. To accurately calculate torque/flux linkage error, the flux reference value that is used should account for the injected current. Referring to FIG. 9, there is shown a stator flux linkage hysteresis control band where flux reference is modulated to adjust an outer band 405 and inner band 410 to compensate for changes in flux linkage that are induced by injection of a third harmonic current. It can be noted that the inner and outer bands 405 and 410 include three lobes. Referring also to FIG. 10, there is shown a generally analogous band where injection of the fifth harmonic occurs, and thus including five lobes. Generation of the reference hysteresis band is based on the rotational vector concept. In conventional DTC, with constant vector amplitude the rotational trajectory will be of a circular type. When the vector amplitude is modulated by harmonics, then the trajectory will exhibit a symmetric pattern for the third harmonic and the fifth harmonic as in FIGS. 9 and 10, which pattern can be applied to any other order of harmonic modulation. With these modulations, the vector switching sequence and pattern are changed to reflect the stator flux variation as well as the stator current harmonic. In other control strategies, for example, field oriented control (FOC) different considerations may apply. For FOC, flux harmonic components can be modulated according to a desired d axis field current command. With this sort of modulation, air gap flux on the rotor d axis can be reshaped with the desired harmonic component and dedicated harmonic inductors positioned to pick up the changed flux distribution.

Figure 12:
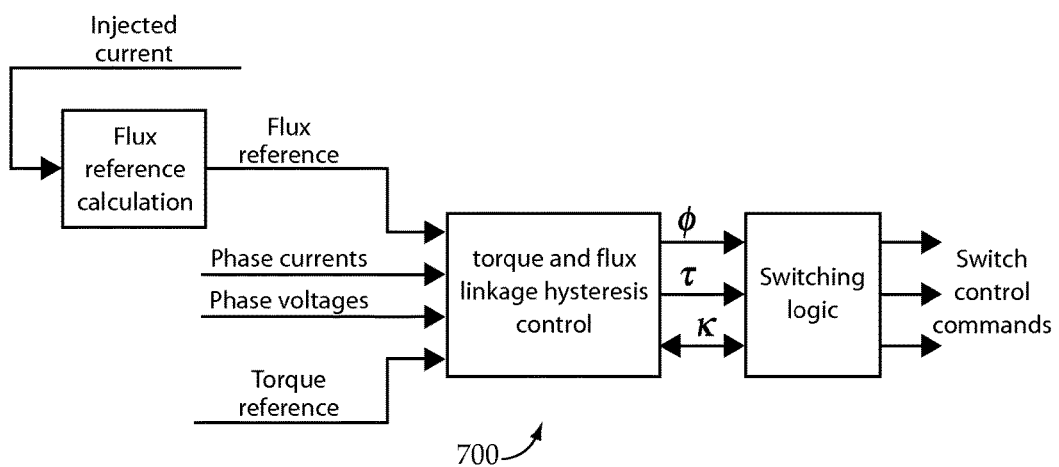
FIG. 12 is a block diagram illustrating example calculations in executing a control routine according to one embodiment.

Referring to FIG. 12, there is shown a diagram 700 showing a simplified version of example computations and logic to generate switch control commands for controlling switches, such as transistor switches in mechanism 36 according to a DTC strategy. It can be seen from block diagram 700 that an injected current is considered in a flux reference calculation to produce a flux reference value. The flux reference value and a torque reference value are processed along with measured phase currents and phase voltages to produce flux and torque estimations used in torque and flux linkage hysteresis control. These calculated values are processed according to the switching logic to generate switch control commands as shown in FIG. 12.

Figure 11:
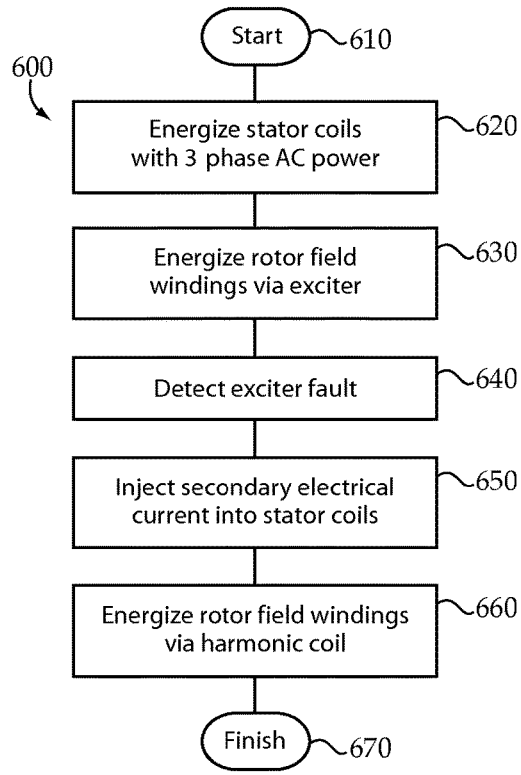
FIG. 11 is a flowchart illustrating example control logic flow according to one embodiment.

Referring to FIG. 11, there is a shown a flow chart 600 illustrating example process flow in operating an electromagnetic machine system according to the present disclosure. The process of flowchart 600 begins at a START 610, and proceeds to step 620 to energize the stator coils with three phase AC power as discussed herein. From step 620, the logic may advance to step 630 to energize the rotor field windings via the exciter. From step 630 the logic may advance to 640 to detect an exciter fault also in the manner contemplated herein, or any other manner of detecting a failure or degradation or expected failure or degradation of exciter 22. From step 640, the logic may advance to step 650 to inject secondary electrical current into the stator coils. From step 650, the logic may advance to step 660 to energize the rotor field windings via the harmonic coil, in other words via electrical excitation current produced in inductor 38. From step 660, the process may END at step 670.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For instance, while the foregoing description and illustrations include only one pole shoe on a rotor equipped with a dedicated harmonic winding the present disclosure is not limited as such, and harmonic windings could be positioned on other pole shoes or potentially elsewhere depending upon the rotor design. Other aspects, features and advantages will be apparent upon an examination of the attached drawings and appended claims.

What is claimed is:

1. An electromagnetic machine system comprising:
a rotor including rotor windings;
a stator positioned about the rotor and including stator windings structured to conduct primary electrical currents;
a current injection mechanism coupled with the stator windings and structured to inject secondary electrical currents into the stator windings such that a flux distribution of a magnetic field produced by the stator is changed; and
the rotor further including an inductor coupled with the rotor windings and positioned to interact with the magnetic field when the flux distribution is changed, so as to produce an electrical excitation current for exciting the rotor windings, wherein the inductor is a part of exciter circuitry resident on the rotor and including a rectifier structured to convert the electrical excitation current from AC to DC.

2. The machine system of claim 1 wherein an air gap extends between the rotor and the stator, and the inductor is positioned adjacent to or within the air gap.

3. The machine system of claim 2 wherein the rotor includes a pole shoe and the inductor includes at least one coil mounted upon or within the pole shoe.

4. The machine system of claim 1 wherein the current injection mechanism includes an AC to AC converter structured to inject harmonic currents into the stator windings.

5. The machine system of claim 1 further including an exciter separate from the rotor and coupled to the exciter circuitry.

6. The machine system of claim 1 comprising a synchronous electric motor that includes the rotor and the stator.

7. The machine system of claim 6 wherein the synchronous electric motor is brushless.

8. A rotor for an electromagnetic machine comprising:
a rotor body defining a rotor axis;
a plurality of sets of rotor windings positioned on the rotor body at a plurality of locations spaced circumferentially about the rotor axis, and each of the plurality of sets of rotor windings being positioned and oriented relative to the longitudinal axis so as to produce a rotor magnetic field, when electrically excited, that interacts with a stator magnetic field produced by a stator extending about the rotor and conducting primary electrical currents; and
exciter circuitry resident on the rotor body, the exciter circuitry being coupled to the rotor windings and including an inductor having at least one of a position and an orientation about the rotor axis that is different from any one of the rotor windings, and the inductor being structured according to the at least one of a position and an orientation to interact with the stator magnetic field to produce an excitation current for exciting the rotor windings, when a flux distribution of the stator magnetic field is changed in response to injection of secondary electrical currents into the stator, wherein the exciter circuitry includes a rectifier coupled to the inductor, and a DC bus coupling the rectifier to the rotor windings.

9. The rotor of claim 8 wherein the inductor includes at least one coil.

10. The rotor of claim 9 further comprising a pole shoe, and the at least one coil is mounted upon or within the pole shoe.

11. The rotor of claim 10 further including a plurality of pole shoes mounted upon pole supports each extending outwardly from the rotor body and having a set of the rotor windings mounted thereon.

12. The rotor of claim 8 wherein the exciter circuitry further includes electrical connection leads structured to couple the exciter circuitry with an external exciter.

13. A method of operating an electromagnetic machine system comprising:
providing a rotor including rotor windings, a stator positioned about the rotor and including stator windings structured to conduct primary electrical currents, a current injection mechanism coupled with the stator windings and structured to inject secondary electrical currents into the stator windings such that a flux distribution of a magnetic field produced by the stator is changed, the rotor including an inductor coupled with the rotor windings and positioned to interact with the magnetic field when the flux distribution is changed so as to produce an electrical excitation current for exciting the rotor windings, the inductor being a part of exciter circuitry resident on the rotor and including a rectifier structured to convert the electrical excitation current from AC to DC;
injecting with the current injection mechanism electrical current into the stator windings in the electromagnetic machine system, such that the flux distribution pattern of the magnetic field produced by the stator is changed;
inducing the electrical excitation current via the magnetic field in the inductor of the rotor in the electromagnetic machine system when the flux distribution pattern is changed;
converting with the rectifier the electrical excitation current from AC to DC; and
exciting the windings of the rotor via the electrical excitation current.

14. The method of claim 13 wherein the injecting includes injecting harmonic current into windings of the stator so as to vary the flux distribution pattern in an air gap between the stator and the rotor.

15. The method of claim 14 further comprising calculating a flux reference term responsive to a magnitude of the injected electrical current, and determining a switch control command responsive to the flux reference term.

16. The method of claim 15 wherein the stator and rotor are parts of a synchronous electric motor, and further comprising maintaining synchronous coupling between the rotor and the stator by way of the exciting, during a fault condition of an external exciter.

* * * * *